Nov. 15, 1949
M. R. LUDWIG
2,488,420
ELECTRONIC MEASURING SYSTEM HAVING
RESIDUAL POTENTIAL COMPENSATION
Filed April 23, 1945
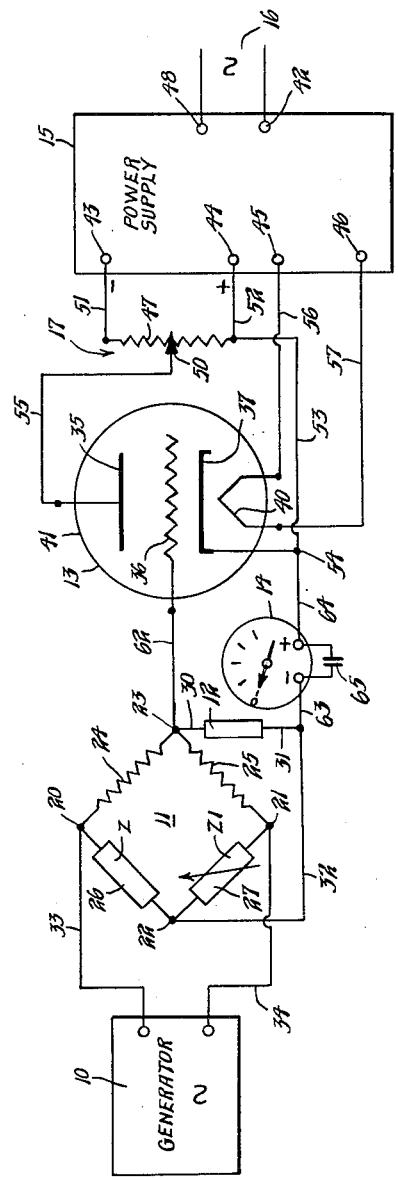
INVENTOR
MERLE R. LUDWIG
BY *George H. Fisher*
ATTORNEY Patented Nov. 15, 1949

2,488,420

UNITED STATES PATENT OFFICE 2,488,420

ELECTRONIC MEASURING SYSTEM HAVING RESIDUAL POTENTIAL COMPENSATION

Merle R. Ludwig, Minneapolis, Minn., assignor to Minneapolis-Honeywell Regulator Company, Minneapolis, Minn., a corporation of Delaware Application April 23, 1945, Serial No. 589,714

11 Claims. (Cl. 171—95)

This invention relates to the field of electrical measuring instruments, and more particularly to such instruments in which an alternating voltage is measured in terms of the average value of a unidirectional current obtained by impressing the voltage to be measured upon the terminals of an electronic rectifier.

The principles of half wave rectification and diode detection are well known to those skilled in the art, and one of the difficulties in practicing this method of measurement has always been the fact that in an electron discharge tube, even when the potential between the anode and the cathode is zero, a small current still flows in the tube, due probably to the initial velocity given to the electrons when the cathode is heated. Attempts have been made to overcome this by the use of an apertured third electrode or grid located between the cathode and the anode, which is maintained at such a negative potential with respect to the cathode as to inhibit the passage of electrons through it and to the plate in the presence of zero plate-to-cathode potential. This expedient has proved only partially successful, since due to the relatively greater distance between the plate and cathode as compared to the distance between the grid and cathode, a negative grid bias sufficient to inhibit the flow of current for zero signal is also sufficient to prevent the flow of plate current for small signal voltages between plate and cathode, thus reducing the sensitivity of the system.

It is accordingly an object of my invention to provide a circuit of the type described in which the discharge current is zero for a zero signal voltage, while the sensitivity of the device is not seriously affected.

Another object of my invention is to provide such a measuring instrument in which the signal responsive discharge takes place between a first pair of electrodes, and is maintained at zero value for zero signal voltage by an electrode located external of and in a continuation of the discharge path.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

The single figure of the drawing is a schematic wiring diagram of an electrical measuring system embodying my invention. The system is shown to comprise a generator 10 energizing an impedance bridge 11. The output of bridge 11 is impressed upon the input impedance 12 of an electron discharge device 13, the input circuit including a meter 14. The filament and anode circuits of the electron discharge device are energized through a power supply unit 15 from a source 16 of suitable alternating voltage. A potential divider 17 is provided for regulating the energization of the anode circuit of the electron discharge device.

Generator 10 is shown as being a self-contained source of alternating voltage, and its frequency may lie in the audio frequency range, the radio frequency range, or even in the ultra-high frequency range, depending on the purpose of the measurement being made. On the other hand, for some purposes it is perfectly satisfactory to energize bridge circuit 11 from the source 16 which energizes power supply 15.

Bridge 11 is shown to comprise a pair of input terminals 20 and 21 and a pair of output terminals 22 and 23. While any conventional bridge may be used in the practice of my invention, this bridge is herein shown as comprising a pair of resistance members 24 and 25 and a pair of impedance members 26 and 27, the last being shown as adjustable. It will be appreciated that member 27 may be a variable resistance or a capacity pickup, or that members 26 and 27 may cooperate to comprise a magnetic or a capacity pickup, all as is well known in the art.

Impedance member 12 is connected across output terminals 22 and 23 of bridge 11 by conductor 30 and conductors 31 and 32. Generator 10 is connected to input terminals 20 and 21 of bridge 11 by conductors 33 and 34. For the balanced condition of the bridge, the voltage drop between input terminal 20 and output terminal 23 is equal to the voltage drop between input terminal 20 and output terminal 22, and no potential difference is impressed across impedance member 12. For any other condition of bridge 11, the voltage drops within the bridge are no longer equal, and a potential difference is impressed across member 12 depending upon the degree of unbalance of the bridge.

Electron discharge device 13 comprises a triode having a plate or anode 35, a grid 36, a cathode 37, and a heater filament 40, all arranged in a conventional fashion within a suitable evacuated envelope 41. The triode derives its signal potential from impedance member 12, and its anode and filament energization from power supply 15.

Power supply unit 15 is shown to comprise a pair of power input terminals 48 and 42, a pair of anode output terminals 43 and 44, and a pair of heater output terminals 45 and 46: the construction of such power supplies is conventional, and details of the structure of this device will not be given, further than to say the voltage appearing between terminals 43 and 44 is substantially ripple free D. C. derived by a process of rectification and filtering from source 16, while the voltage supplied by output terminals 45 and 46 is conventionally raw A. C. of reduced amplitude such as is provided from source 16 by a step-down transformer. The circuit to heater 40 of triode 13 is completed from terminals 45 and 46 of power supply 15 through conductors 56 and 57.

Potential divider 17 is shown to comprise a resistance winding 47 and a contacting slider 50. The function of this potential divider is to vary the voltage energizing the anode circuit of triode 13, and for this purpose the ends of winding 47 are connected to output terminals 43 and 44 of power supply unit 15 by conductors 51 and 52, respectively, the latter conductor being extended by a further conductor 53 to make connection with cathode 37 at junction point 54. Slider 50 is connected with anode 35 of triode 13 by conductor 55.

As indicated in the drawing, the lower terminal of resistance winding 47 and the cathode of the triode are connected to the positive terminal of the anode power supply: the potential of anode 35 therefore becomes increasingly negative with respect to cathode 37 as slider 50 moves upward along resistance winding 47.

Meter 14 is a conventional D. C. current meter, and may be of such a range as is required by the characteristics of triode 13 and the values of the associated circuit constants. A condenser 65 is connected across the terminals of meter 14. The meter is connected in the grid circuit of triode 13 which may be traced from the upper terminal of impedance member 12 through conductor 30, terminal 23, conductor 62, grid 36, cathode 37, junction point 54, conductor 64, meter 14, and conductors 63 and 31 to the lower terminal of member 12. As a study of the figure will show, grid 36 and cathode 37 cooperate to form a half wave rectifier, energized from the voltage drop across impedance member 12, and meter 14 is connected in the rectifier circuit to give a reading of the average value of the pulsating unidirectional current conducted through the rectifier.

*Operation*

Let it be assumed that generator 10 and source 16 are continuously energizing their respective load circuits, that slider 50 is at its lowermost position, and that bridge 11 is unbalanced. Under these conditions, a voltage drop appears across impedance member 12 and is impressed between the grid and cathode of triode 13, resulting in the flow of a half wave current having the same period as does the voltage supplied by generator 10, and having a direct current component which varies with the voltage impressed between the grid and cathode. Condenser 65 is effective to largely by-pass the alternating component of the half wave current, and, due to its mechanical inertia, meter 14 is unable to follow the residual fluctuations of this half wave ripple. The meter accordingly takes a position corresponding to the average value or direct current component of the current.

Let bridge 11 be adjusted until it reaches a balanced condition. There should now be no voltage drop across member 12 derived from bridge unbalance, no discharge through triode 13, and no indicated current at meter 14. Actually, however, since the anode is still at cathode potential, this is not the case, the initial velocity given to the electrons by the high temperature of cathode 37 being sufficient to cause a certain number of the electrons to pass over to grid 36 even in the absence of a positive potential thereon with respect to cathode 37. This results in the flow of zero current in the grid circuit of the tube, whose magnitude is indicated by meter 14. The magnitude of this zero current varies with the temperature of the cathode, and any reading of meter 14 due to a bridge unbalance is incorrect by the amount of this zero current.

I have found that when anode 35 is maintained at a negative potential with respect to cathode 37, the initial velocity given to the electrons due to the heat of cathode 37 is overcome by repulsion between the negatively charged electrons and the negatively charged plate, so that by suitable adjustment of slider 50 a negative voltage may be provided between plate 35 and cathode 37 which is just sufficient to inhibit the flow of the zero current previously defined. Since this inhibiting or control voltage is located out of the discharge path for the half wave current, the sensitivity of the instrument to small bridge unbalance voltages is in no way lessened.

I have pointed out that the zero current varies with temperature. Since the temperature of the cathode is determined by the amount of filament current, and since this in turn is determined by the voltage of source 16, my invention compensates in large measure for variation in the supply voltage by deriving the control voltage from the same source. When the voltage of source 16 increases, then, the filament current also increases, giving the electrons a higher initial velocity, but at the same time the negative potential of the plate with respect to the cathode also increases, increasing the force of repulsion and largely inhibiting the increased zero current due to the increased temperature of the cathode.

It is, of course, understood that the choice of circuit constants for a system embodying my invention is within the skill of those familiar with electronic devices and circuits. Nevertheless, for purposes of illustration only I append details of one embodiment of this invention which has operated with great satisfaction. In this embodiment generator 10 operates at 140 kilocycles, impedance member 12 comprises a 30 millihenry choke and a 300 micromicrofarad condenser connected in parallel, and signals up to 5 volts are derived from the bridge. Triode 13 comprises one section of a 7N7 tube with a normal voltage on the filament of 6.1 and a normal voltage on the plate of −22. A meter having a range of 1 milliampere is used, shunted by a .01 microfarad condenser, and for a 5 volt signal the grid current gives substantially a full scale indication on the meter. As the voltage of source 16 varies from 90 to 135 volts, the plate voltage for the same setting of slider 50 varies from —16 to —30 volts, and the resulting change in the indication of the meter was not appreciable.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matter of shape, size, and arrangement of parts, within the principle of the invention, to the full extent indicated by the broad general meaning of the terms in which the appended claims are expressed.

I claim as my invention—

1. In a device of the class described, in combination: a cathode capable of thermal emission of electrons; a second electrode; means providing an electron discharge path between said electrodes; a source of alternating signal voltage; means impressing said voltage between said electrodes; a further electrode located in a continuation of said discharge path; electric heating means for maintaining said cathode in a thermoemissive state; means maintaining said further electrode at a variable negative potential with respect to said emissive electrode, whereby to reduce to zero the flow of current between said first named electrodes when the amplitude of said signal voltage is zero; a source of electrical energy, and means connecting said source with said heating means and said maintaining means for energization thereof.

2. In a device of the class described, in combination: an electron emissive electrode; an electrode having apertures therethrough; means providing an electron discharge path between said electrodes; a source of alternating signal voltage; means impressing said voltage between said electrodes, said means including means responsive to unidirectional flow of current between said electrodes; a further electrode located in a continuation of said discharge path beyond said second electrode; and means maintaining said further electrode at a variable negative potential with respect to said emissive electrode, whereby to reduce to zero the flow of current between said first named electrodes when the amplitude of said signal voltage is zero.

3. In a device of the class described, in combination: a first electrode capable of thermal emission of electrons; a second electrode having apertures therethrough; means providing an electron discharge path between said electrode; a first source of alternating voltage of signal frequency and variable amplitude; means applying said voltage to said electrodes, said means including means responsive to unidirectional flow of current; a second source of alternating voltage of a power frequency; electric heater means for causing said thermal emission from said first electrode; means energizing said last named means from said second source; a further electrode located in a continuation of said discharge path beyond said second electrode; means maintaining said further electrode at a negative potential with respect to said thermoemissive electrode; and means energizing said last named means from said second source.

4. In a device of the class described, in combination: an electron discharge device including an electron emissive cathode, a plate, and an intermediate grid; a source of electrical power; means deriving energy from said source; means connecting said means to said cathode and said plate for maintaining said plate at a negative potential with respect to said cathode; means impressing an alternating voltage of variable amplitude between said grid and said cathode; means measuring the resulting pulsating unidirectional grid current; and means varying said potential whereby to adjustably inhibit the flow of said grid current.

5. In a device of the class described, in combination: an electron discharge device including an electron emissive cathode, a plate, and an intermediate grid; a source of electrical power; means deriving energy from said source and heating said cathode; further means deriving energy from said source; means connecting said further means to said cathode and said plate for maintaining said plate at a negative potential with respect to said cathode; means impressing an alternating voltage of variable amplitude between said grid and said cathode; and means measuring the resulting pulsating unidirectional grid current.

6. In a device of the class described, in combination: an electronic rectifier presenting a path for ready flow of unidirectional current; a circuit including said rectifier and means impressing an alternating voltage upon electrodes of said rectifier, said means including means responsive to flow of unidirectional current; and adjustable means, including an electrode located externally of said circuit and in a continuation of said path, for variably inhibiting the flow of said current.

7. In a device of the class described, in combination: an electron discharge device having an anode, a cathode, an intermediate grid, and a heater filament; means comprising grid, anode, and filament circuits for said device; a source of electrical energy of a power frequency; means energizing said filament circuit from said source; means energizing said anode circuit from said source in such a fashion as to maintain said anode at a variably negative potential with respect to said cathode; means energizing said grid circuit with alternating voltage of a signal frequency; and means, included in said grid circuit, for responding to the average value of the pulsating grid current.

8. In a device of the class described, in combination: an impedance bridge having input and output terminals; means energizing the input terminals of said bridge with alternating voltage of a signal frequency; an electron discharge device having an anode, an electron emissive cathode, and an intermediate grid; means connecting the output terminals of said bridge to the grid and cathode of said discharge device, said means including means responsive to unidirectional current flow; and means maintaining said anode at a variable negative potential with respect to said cathode.

9. In a device of the class described, a triode having an anode, a control grid, and a thermoemissive cathode, means impressing a signal voltage between the grid and the cathode of said triode, means measuring the grid current in said triode, means maintaining the anode of said triode at a variable negative potential with respect to said cathode, whereby to adjustably inhibit the flow of said grid current, and means energizing said last named means and said thermo-emissive cathode from a common source of variable alternating voltage, whereby to compensate said grid current for change in emission due to variation in the voltage of said source.

10. In a device of the class described, a triode, means energizing the heater of said triode, means impressing a signal voltage between the grid and the cathode of said triode, means measuring the grid current in said triode, means maintaining the anode of said triode at a variable negative potential with respect to said cathode, whereby to adjustably inhibit the flow of said grid current, and a common source energizing said first named means and said last named means, whereby upon variation of said source compensating increases occur in the energy of said means so that said grid current remains substantially unaltered.

11. In a device of the class described, in combination: an electronic rectifier including a cathode electrode and a second electrode presenting a path for ready flow of unidirectional current; a circuit including said rectifier and means impressing an alternating voltage upon said cathode electrode and said second electrode, said means including means responsive to flow of unidirectional current; and adjustable means, including a third electrode located externally of said circuit and in a continuation of said path and having a negative potential with respect to said cathode electrode for inhibiting the flow of said current.

MERLE R. LUDWIG.

REFERENCES CITED

The following references are of record in the file of this patent:

UNITED STATES PATENTS

| Number | Name | Date |
|---|---|---|
| 1,404,311 | O'Neill | Jan. 24, 1922 |
| 1,595,729 | Press | Aug. 10, 1926 |
| 1,846,043 | Terman | Feb. 23, 1932 |
| 1,933,773 | Terman | Nov. 7, 1933 |
| 1,966,047 | Ryall | July 10, 1934 |
| 2,137,846 | Klutke | Nov. 22, 1938 |
| 2,198,226 | Peterson | Apr. 23, 1940 |
| 2,262,838 | Deloraine et al. | Nov. 18, 1941 |
| 2,294,065 | Anderson | Aug. 25, 1942 |
| 2,324,215 | Kinsburg | July 13, 1943 |

FOREIGN PATENTS

| Number | Country | Date |
|---|---|---|
| 477,392 | Great Britain | Dec. 22, 1937 |

OTHER REFERENCES

Proc. of I. R. E., vol. 32, No. 6, June 1944, "High-Potential Vacuum-Tube Voltmeter" by Weisz.